US008429646B2

(12) United States Patent
Yamaguchi

(10) Patent No.: US 8,429,646 B2
(45) Date of Patent: Apr. 23, 2013

(54) DATA OUTPUT APPARATUS, DATA PROCESSING APPARATUS AND DATA OUTPUT SYSTEM INCLUDING THESE APPARATUSES

(75) Inventor: Yasuhiko Yamaguchi, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1717 days.

(21) Appl. No.: 11/194,615

(22) Filed: Aug. 2, 2005

(65) Prior Publication Data
US 2006/0227343 A1    Oct. 12, 2006

(30) Foreign Application Priority Data

Apr. 7, 2005    (JP) .............................. JP2005-110441

(51) Int. Cl.
*G06F 9/445* (2006.01)
*G06F 9/44* (2006.01)
*G06F 3/12* (2006.01)

(52) U.S. Cl.
USPC ............................ 717/178; 717/173; 358/1.1

(58) Field of Classification Search ................ 358/1.1; 717/168–178
See application file for complete search history.

(56) References Cited

U.S. PATENT DOCUMENTS

| 7,003,657 | B2 * | 2/2006 | Nelson et al. ..................... 713/1 |
| 7,064,849 | B1 * | 6/2006 | Nishikawa et al. .......... 358/1.15 |
| 7,185,289 | B1 * | 2/2007 | Taima ........................... 715/810 |
| 2002/0129353 | A1 * | 9/2002 | Williams et al. .............. 717/175 |
| 2004/0184059 | A1 * | 9/2004 | Chun et al. .................... 358/1.13 |
| 2004/0246505 | A1 * | 12/2004 | Oh .................................. 358/1.1 |
| 2005/0264830 | A1 * | 12/2005 | Une et al. ....................... 358/1.1 |

FOREIGN PATENT DOCUMENTS

| JP | 11-134140 | 5/1999 |
| JP | 2002-120444 | 4/2002 |
| JP | 2004-13773 | 1/2004 |
| JP | 2004-050585 | 2/2004 |
| JP | 2004-252510 | 9/2004 |
| JP | 2005-72912 | 3/2005 |

OTHER PUBLICATIONS

Japanese Office Action dated Apr. 24, 2008.

* cited by examiner

*Primary Examiner* — Li B Zhen
*Assistant Examiner* — Ryan Coyer
(74) *Attorney, Agent, or Firm* — Finnegan, Henderson, Farabow, Garrett & Dunner, L.L.P.

(57) ABSTRACT

The multi function peripheral 20 stores the common codes 40 which have been commonly assigned to plural types of message data having the same meaning in different languages, and sends the common codes and the language designation information to the data processing apparatus 60. The data processing apparatus 60 has the vernacular message group 70 in which the correspondence between the message and the common code has been established for plural languages. The data processing apparatus 60 extracts, from the vernacular message group 70, message data which are identified by combination between the common code and the language designation information received from the multiple function processing apparatuses 20, and sends the message data to the multiple function processing apparatuses 20. The multiple function processing apparatuses 20 switches display languages on the operation panel or the like by using message data received from the data processing apparatus 60.

28 Claims, 16 Drawing Sheets

FIG. 3 (a)
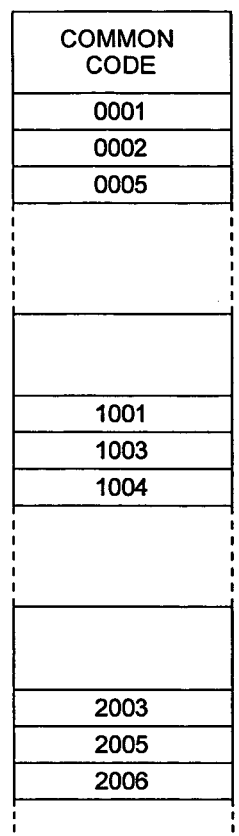
FIG. 3 (c)
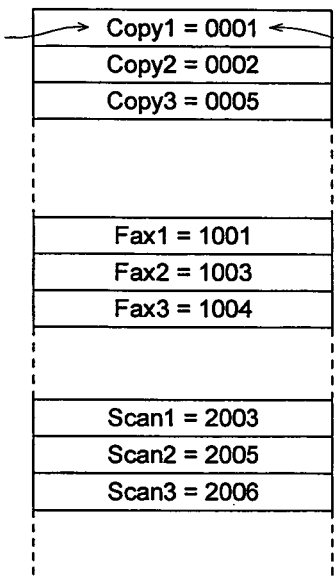
1 0 2 3 ← 40
ID INFORMATION
MODE
INFORMATION
- 0 COPY
- 1 FAX
- 2 SCANNER
- 3 PRINT
- 4 BOX
- 5 IMAGE EDITOR
- 6 USER SETTING
- 7 SERVICE
FIG. 3 (b)

| LANGUAGE = JAPANESE ||
|---|---|
| COMMON CODE | MESSAGE DATA |
| 0001 | READY TO COPY (IN JAPANESE) |
| 0002 | SET THE FRONT SIDE ON THE TOP (IN JAPANESE) |
| 0003 | SET THE FRONT SIDE ON THE BOTTOM (IN JAPANESE) |

| LANGUAGE = ENGLISH ||
|---|---|
| COMMON CODE | MESSAGE DATA |
| 0001 | READY TO COPY |
| 0002 | SET THE FRONT SIDE ON THE TOP |
| 0003 | SET THE FRONT SIDE ON THE BOTTOM |

| LANGUAGE = ||
|---|---|
| COMMON CODE | MESSAGE DATA |
| 0001 | ............ |
| 0002 | ............ |
| 0003 | ............ |

FIG. 13
| No. | RECEIVER | STARTING TIME | TIME | No. OF SHEETS | RESULT | REMARKS |
|---|---|---|---|---|---|---|
| 402 | 042 529 2344 | 09-17 11:10 | 00:00 14 | 002 | OK | 400800008FFF02011002400000000800400000 |
| 403 | | 09-17 13:06 | 00:00 13 | 001 | OK | 400800008FFF02011002400080000000400000 |
| 404 | 03 5396 6443 | 09-17 13:57 | 00:00 25 | 002 | OK | 400800008FFF02021002400000000800400000 |
| 405 | | 09-17 14:15 | 00:00 51 | 000 | TEL | 400800008FFF02021002400000000800400000 |
| 406 | 042 529 2344 | 09-17 14:50 | 00:00 13 | 002 | OK | 400800008FFF02011002400000000800400000 |
FIG. 14
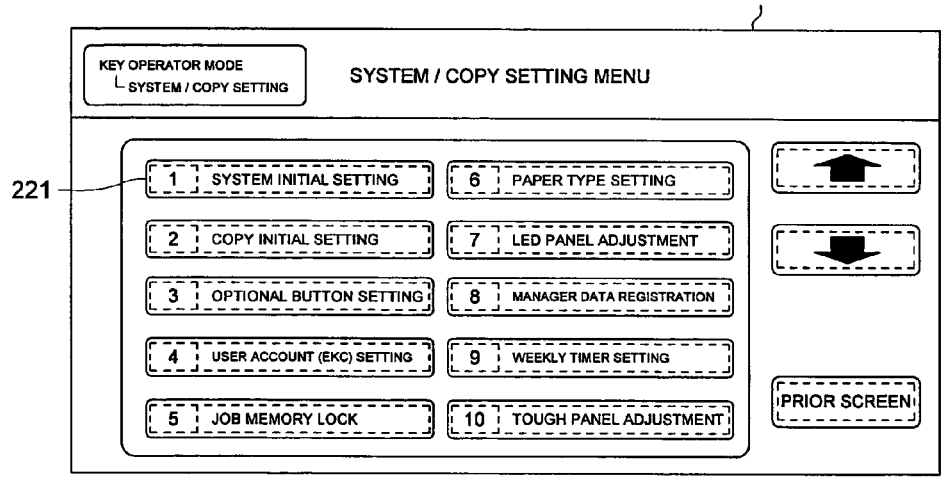
FIG. 15
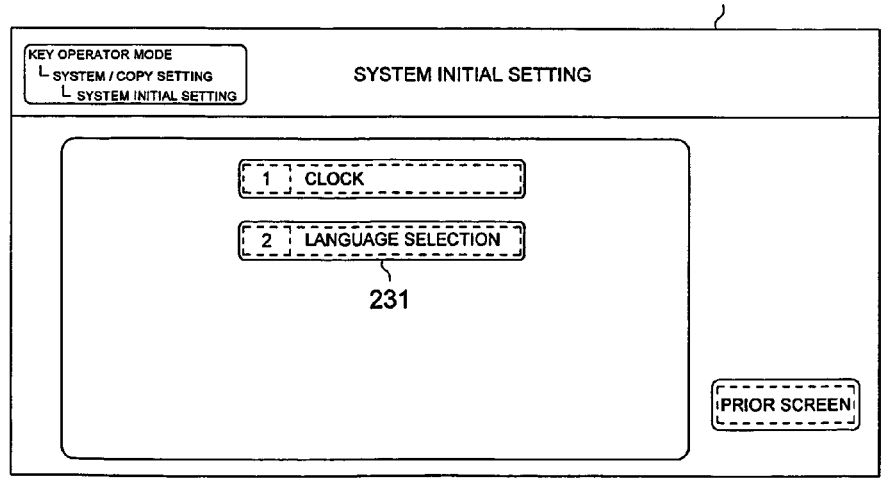

DATA OUTPUT APPARATUS, DATA PROCESSING APPARATUS AND DATA OUTPUT SYSTEM INCLUDING THESE APPARATUSES

RELATED APPLICATION

This application is based on Japanese Patent Application No. 2005-110441 filed on Apr. 7, 2005 in Japanese Patent Office, the entire content of which is hereby incorporated by reference.

BACKGROUND

1. Field of the Invention

The present invention is related to a data output apparatus which conducts output processes such as display or printing, and a relevant data processing apparatus and data output system, and is especially related to technology to change output forms to the language of each country, or other requirements.

2. Description of the Related Art

Conventionally, in a data output apparatus such as a digital multiple function processing apparatus, a method to previously store message data or fonts in ROM (Read Only Memory) for the necessary language of each country is generally employed so that the language to be used on the display panel or the language to be used on a printed report corresponds to the desired language.

There are apparatuses which obtain data for display or printing from a server through a network. For example, proposed is a printer which obtains data related to the local language usually used in the installation place of the printer from a server by sending location data to the server after judging the location by using GPS (Global Positioning System). (refer to Patent Document 1)

[Patent Document 1] Tokkai No. 2004-50585

In a method to previously store messages or fonts for each language, large memory capacity is required because it is necessary to store in ROM, messages and fonts for all the languages which might be used. Further, the languages used in the installation place are mostly only a small part of multiple languages assumed to be used, therefore, a large part of memory capacity is occupied in vain by actually unused data. Still further, in the case of a language which was not anticipated, complicated work such as a ROM change is required to employ the language because no data for its display or printing have been installed for unanticipated languages.

When a method is employed to obtain messages and fonts related to a desired language from a server, it becomes possible to flexibly and effectively employ the language of each country compared to storing data in ROM. The type of message actually needed, however, depends on the function of the apparatus of the client side.

If the server controls such differences, control load of the server side becomes excessive. On the other hand, if all messages and fonts related to the language required by the apparatus are sent from the server without consideration of the difference of function of each apparatus, the communication load is increased due to the huge amount of sent data, and regarding the client side, a large part of memory capacity is consumed to store a large amount of received data. Further, since there are requirements to change the output form of display or printing corresponding to user needs other than for a specific language, similar problems also result regarding such requirements.

SUMMARY

In view of foregoing, an object of this invention is to provide new apparatus, new system and new method.

This and other objects are attained by any of the following configurations.

(1) A data output apparatus comprises
a first storage which stores a common code corresponding to message data,
wherein the common code is commonly shared by plural kinds of message data;
a transmitting section which transmits the common code and designation information designating a kind of message data to an external device;
a receiving section which receives message data identified by the common code and the designation information from the external device; and
an output processing section which conducts an output processing based on the received message data.

(2) A data output system comprises
a data output apparatus; and
a data processing apparatus connected to the data output apparatus;
wherein the data output apparatus includes
a first storage which stores a common code corresponding to message data,
wherein the common code is commonly shared by plural kinds of the message data, and
a transmitting section which transmits the common code and designation information designating a kind of the message data to the data processing apparatus,
wherein the data processing apparatus includes
a data storage which stores message data, designation information and a common code associated with each other,
a request receiving section which receives the common code and the designation information transmitted from the transmitting section of the data output apparatus,
an extracting section which extracts message data identified by the common code and the designation information from the data storage, and
an extracting result transmitting section which transmits the extracted message data to the data output apparatus,
wherein the data output apparatus further includes
a receiving section which receives the extracted message data, and
an output processing section which conducts an output processing based on the received message data.

(5) A data output method comprises steps of:
storing a common code corresponding to message data in a first storage,
wherein the common code is commonly shared by a plural kinds of message data;
transmitting the common code and a designation information identifying a kind of message data to an external device;
receiving message data identified by the common code and the designation information; and
conducting an output processing based on the received message data.

The invention itself, together with further objects and attendant advantages, will best be understood by reference to the following detailed description taken in conjunction with the accompanying drawings.

BRIEF DESCRIPTION OF THE DRAWINGS

FIG. 3 is an explanatory diagram showing an example of the common codes stored in the flash ROM of the multiple function processing apparatus related to the embodiment of the present invention.

FIG. 5 is an explanatory diagram showing an example of the vernacular message group stored in the message DB of the data processing apparatus related to the embodiment of the present invention.

FIG. 6 is an explanatory diagram showing an example of the font data stored in the font DB of the data processing apparatus related to the embodiment of the present invention.

FIG. 8 is a flowchart of operations of the multiple function processing apparatus related to the embodiment of the present invention, to be carried out when the power supply is switched ON.

FIG. 13 is an explanatory diagram showing an example of a communication control report which the multiple function processing apparatus related to the embodiment of the present invention prints out.

FIG. 14 is an explanatory diagram showing an example of the system/copy setting menu screen which the multiple function processing apparatus related to the embodiment of the present invention displays.

FIG. 15 is an explanatory diagram showing an example of the system initial setting screen which the multiple function processing apparatus related to the embodiment of the present invention displays.

In the following description, like parts are designated by like reference numbers throughout the several drawings.

DETAILED DESCRIPTION OF THE PREFERRED EMBODIMENT section The embodiments of the present invention are described below with reference to the drawings.

Figure 1:
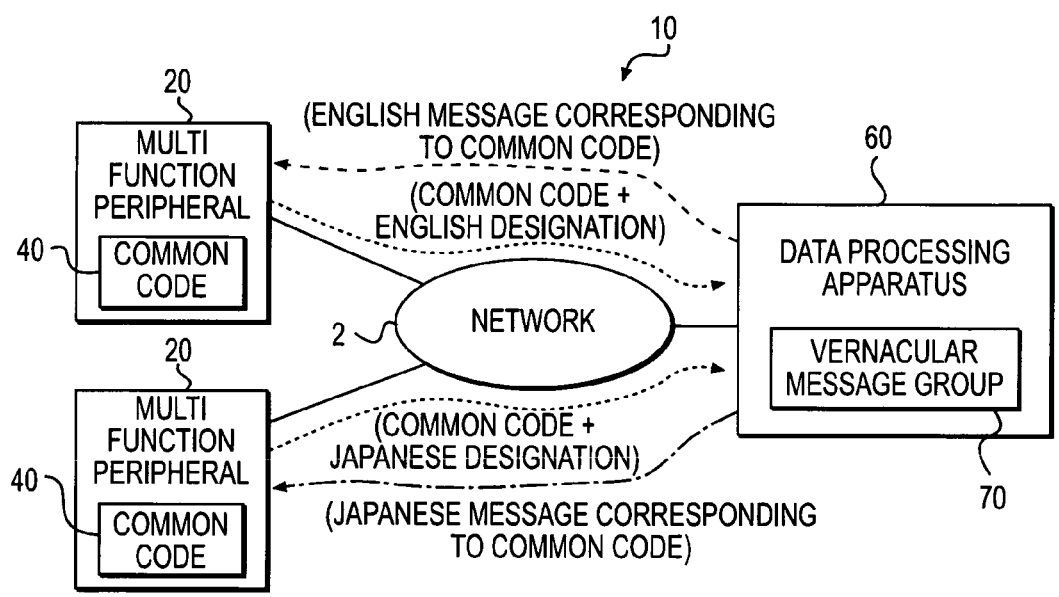
FIG. 1 is an overall system configuration diagram of the data output system related to the embodiment of the present invention.

FIG. 1 shows the overall configuration diagram of the data output system 10 according to the present embodiment of the present invention. The data output system 10 is configured to comprise a multi function peripheral 20 as the data output apparatus and a data processing apparatus 60. The multi function peripheral 20 and the data processing apparatus 60 are both connected to each other via a network 2 such as the Internet or a LAN (Local Area Network).

The data output system 10 has been configured so that the multi function peripheral 20 and the data processing apparatus 60 operate cooperatively to realize the vernacular support function that changes the language in which the display is made in the display and operation section of the multi function peripheral 20 or in which various types of reports are printed, into the languages of different countries. They also cooperatively operate to realize the conversion function, such as the kana-kanji (syllabic writing-Chinese character) conversion in Japanese language which searches for the conversion alternatives for a designated character string.

Explaining the vernacular support function using an example, messages such as "Ready to copy" in English and their Japanese language equivalent or equivalents in other languages are all assigned a common code (that is, a set of different messages that express the same meaning in different languages), the common codes 40 corresponding to these required messages in the respective multiple function processing apparatuses 20 are stored beforehand in them. On the other hand, in the data processing apparatus 60, the message data expressed in different vernacular (different types of message data) are stored as the vernacular message group 70 for the different countries in which the correspondence between the common code and the country information (the designation information) has been established. The message data are code information so that contents of messages are expressed by character codes. The messages in different languages such as English, French, Japanese, etc., are expressed in character codes in the character code system suitable for the respective languages. In addition, various types of the message data are prepared such as, not only the message "Ready to copy" mentioned above, but also the messages "Ready to print", "Ready to send", etc., and a common code is assigned for each of these messages.

When the common code 40 and the language designation information 43 (the designation information) are sent from the multi function peripheral 20 to the data processing apparatus 60, the data processing apparatus 60 extracts, from the vernacular message group 70, the message data identified from that common code and the designated language, and sends that message data to the multi function peripheral 20. In other words, by changing the language designation, using the same common code, the multi function peripheral 20 can obtain from the data processing apparatus 60 either a message data in Japanese or a message data in English with the same meaning. In addition, it is also possible to make the data processing apparatus 60 transmit, to the multi function peripheral 20, the font data of the language corresponding to the language designation information 43 (the designation information). In this case, if the message can be handled with the font already possessed by the multi function peripheral 20, there is no need to receive font data from the data processing apparatus 60 based on the designation information. In the following, the data output system 10 having these types of functions is described in detail.

Figure 2:
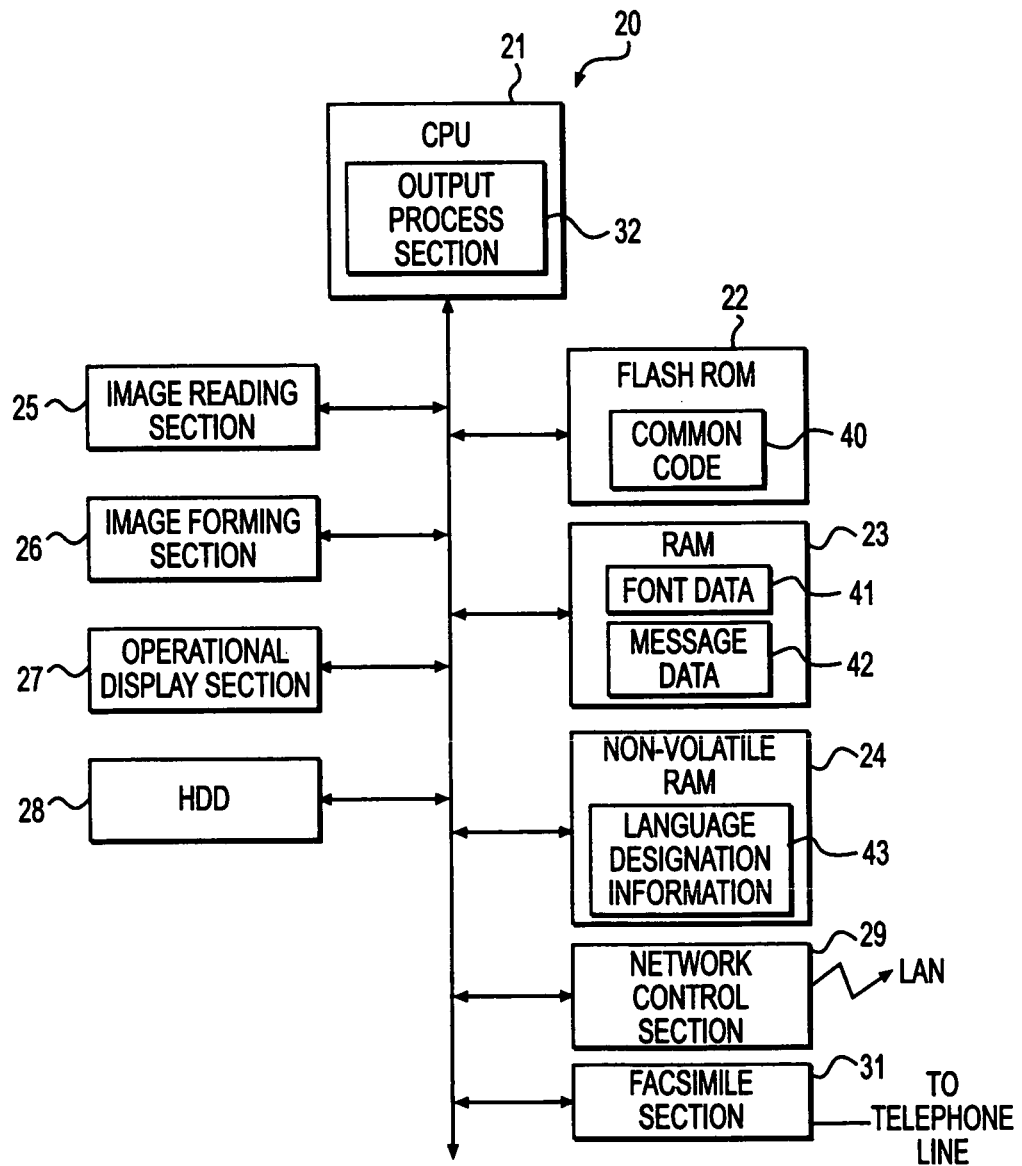
FIG. 2 is a block diagram showing the configuration of the multiple function processing apparatus related to the embodiment of the present invention.

FIG. 2 shows the configuration of the multi function peripheral 20. The multi function peripheral 20 is an apparatus provided with the scanner function of reading the images in the original document, the copying function of reading out the images on the original document and forming the copy image on a recording paper, the printer function of forming images corresponding to print data on a recording paper, and the facsimile function of transmitting and receiving images in documents.

The multi function peripheral 20 is composed of a CPU (Central Processing Unit) 21 that comprehensively controls the operations of the unit, a flash ROM 22, and a RAM (Random Access Memory) 23. The flash ROM 22 stores the programs executed by the CPU 21 and various types of fixed data. In addition, the flash ROM 22 stores the common codes 40 described earlier, and functions as a storage section.

The RAM 23 is a memory that is used as a work memory that temporarily stores various types of data at the time the CPU 21 executes programs, and as the page memory that stores at least one page of the image data for carrying out image rotation and other processing. Further, the RAM 23 also stores the font data 41 or the message data 42 received from the data processing apparatus 60.

The non-volatile RAM 24 is a memory that retains the stored contents even when the power is switched OFF, stores the language designation information 43 which is the designation information for designating the language related to the common code, and constitutes the storage section. Further, the configuration can be a common storage section with the storage section that stores the common code 40 or can be a different storage section.

The image reading section 25 carries out the function of reading the image of the original document and reading in the corresponding image data. The image reading section 25 is provided with a light source that illuminates the document, a line image sensor that reads one line part of the document along its width direction, a moving section that moves the reading position along the longitudinal direction of the document by one line, and an optical path having lenses and mirrors that guide and focus the reflected light from the document to the line sensor. The line image sensor is constituted using a CCD (Charge Coupled Device). The analog video signal outputted by the line image sensor is A/D converted and taken as a digital image data.

The image forming section 26 carries out the function of outputting the image corresponding to the image data by forming the image on a recording sheet using the electrophotographic process. The image forming section 26 is configured as a so-called laser printer having a conveying device for recording paper, a photosensitive drum, a charging unit, a laser unit, a developing unit, a image transferring and separating unit, cleaning unit, and a fixing unit.

The operational display section 27 is configured to have an LCD display provided with a touch panel on its surface and various types of operation switches, and has the functions of carrying out various types of guidance displays and status displays for the user, and of receiving various types of operations made by the user.

The HDD 28 is a large capacity storage device for storing compressed image data, etc. The hard disk drive unit is used for this in this example.

The network control section 29 carries out the functions of a transmission section and a reception section that connects to the network 2 and communicate with external apparatuses. The facsimile section 31 carries out the functions of compressing and decompressing the image data according to the compression method compatible with the facsimile transmission and reception, and the functions of controlling various types of communication procedures for carrying out the facsimile transmission and reception.

The CPU 21 carries out comprehensive control of the different sections described above and realizes the scanner function, the copy function, the printer function, and the facsimile function. In addition, the CPU 21 also carries out the functions as an output processing section 32. The output processing section 32 carries out the function of preparing the image data for output using the message data 42 and the font data 41 received from the data processing apparatus 60. Specifically, it carries out the function of preparing the display data to be sent to the operational display section 27, or the function of preparing the print data for printing various types of reports.

FIG. 3 shows an example of the common codes 40 stored in the flash ROM 22. As is shown in FIG. 3(b), the common codes 40 are constructed as 4-digit integer numbers and the first digit indicates the mode information and the following three digits denote the ID information. The mode information classifies the common code. Here, the classification is being done based on the functions, etc., present in the multi function peripheral 20. Because of having the mode information, the common codes 40 are controlled for each mode, and hence the convenience gets enhanced at the time of adding or deleting the common codes 40. The ID information is the information for identifying the common code individually within each mode. There is no problem even if the number of digits in or the data structure of the common code is changed to suit the needs.

As is shown in FIG. 3(a), the flash ROM 22 stores only the common codes 40 used within that apparatus. In this example, the common codes related to the copy mode are stored as "0001", "0002", "0005" . . . , but the codes "0003" and "0004" are missing, and the missing codes are the common codes used in different models. For example, if the Japanese message corresponding to the common code "0002" is "Set the front side on the top" and the Japanese message for the common code "0003" is "Set the front side on the bottom", since the direction of placing the document in these two messages is opposite and since the messages are mutually exclusive, only one of these two messages will be used according to the specifications of that model. In addition, if the multiple function processing apparatus has only the copy function and does not have the facsimile function, the common codes related to the functions that are not supported are not stored in the flash ROM 22.

FIG. 3(c) shows an example of the data structure used at the time of transmitting the common codes 40 stored in the flash ROM 22 to the data processing apparatus 60. Each common code is transmitted after establishing correspondence with internal codes 45 such as "Copy1" or "Copy2" assigned for managing each message within the multi function peripheral 20. By separately assigning the internal codes 45, for example, even if the common codes are numbered discontinuously, inside the multi function peripheral 20 the messages corresponding to these common codes can be handled with sequential numbers. As is clear from the above, the common codes 40 stored in the multi function peripheral 20 can also be different for different models (products). In other words, although the same set of common codes 40 is stored in the same model, it is also possible to store different sets of common codes 40 in different models. In addition, although the same set of common codes 40 are stored when the same set of functions are provided in the same model, it is also possible to store different sets of common codes 40 in the same model if the supported functions are different. Further, it is also possible to prepare different sets of common codes 40 for each of the types of functions of scanner functions, copy functions, printer functions, and facsimile functions in the data processing apparatus 60, and to provide the set of common code functions 40 prepared according to the functions of the multi function peripheral 20, to the apparatus 20.

Figure 4:
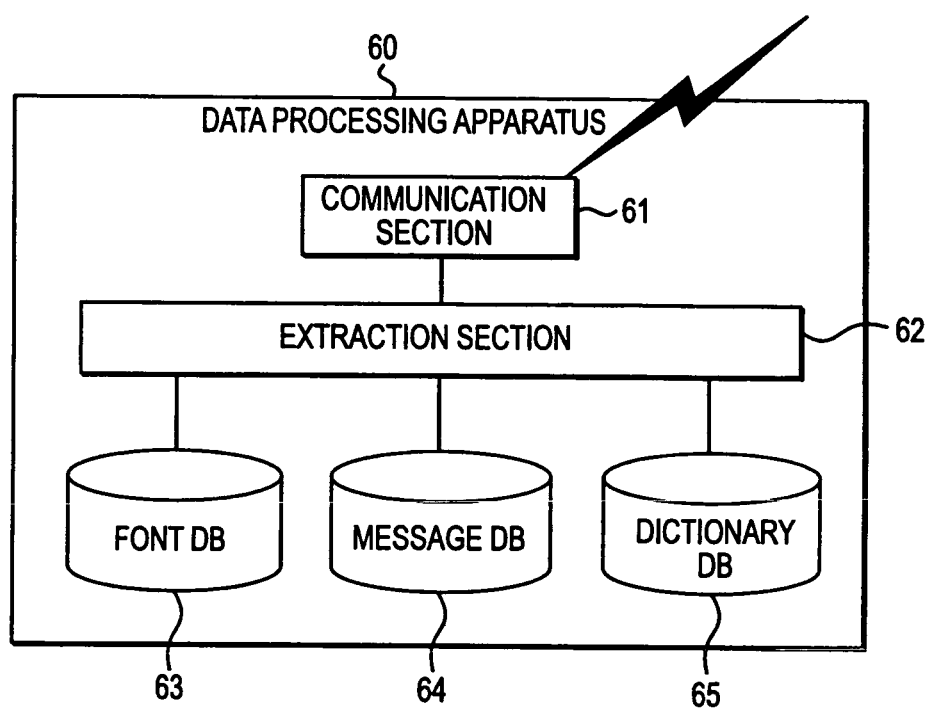
FIG. 4 is a block diagram showing the configuration of the data processing apparatus related to the embodiment of the present invention.

FIG. 4 shows the configuration of the data processing apparatus 60. The data processing apparatus 60 is configured as a server on the network. The data processing apparatus 60 is provided with a communication section 61, an extraction section 62, a font DB (database) 63, a message DB 64, and a dictionary DB 65.

Several font data each supporting a different language are stored in the font DB 63. The vernacular message group 70 are stored in the message DB 64 and functions as a data storage section. The dictionary DB 65 is one that has stored one or more conversion alternatives corresponding to various types of character information, such as the dictionary for kana-kanji conversion in the Japanese language.

The communication section 61 carries out the function of a request reception section that receives the common code 40 or the language designation information 43 from the multi function peripheral 20. The extraction section 62 carries out not only the function of extracting, from the message DB 64, the message data identified by the combination of the common code 40 and the language designation information 43 received by the communication section 61 but also the function of reading out the font data of the language corresponding to the language designation information 43 from the font DB 63 and forming the delivery data including this font data and the message data extracted earlier. The communication section 61 also carries out the function of an extracted result transmission section that transmits the delivery data formed by the extraction section 62 to the multi function peripheral 20 that is the source of the request.

FIG. 5 shows an example of the vernacular message group 70 stored in the message DB 64. The vernacular message group 70 is one in which the correspondence between the message data and the common codes 40 assigned for them is established, and several types of these are registered for each language. For example, in the Japanese message data 70a, the character code expressing the character string "Ready to Copy (in Japanese)" corresponding to the common code "0001" has been registered in a character code corresponding to the Japanese language. Also, in the message data 70b for English, for the same common code "0001", the character code expressing the character string "Ready to Copy (in English)" has been registered in a character code corresponding to the English language. In this manner, for the same common code number, different message data having an almost identical meaning in different languages are registered with character codes corresponding to each language.

Further, the contents registered in the message DB 64 can be added, deleted, or altered whenever required. It is efficient to make such additions or alterations for each language or for each mode information of common codes.

FIG. 6 shows an example of the font data 72 stored in the font DB 63. The font data 72 is the information for expressing a character in the bit map format. The character image 72a is shown in the left part of the figure and indicates the image when the font data 72a is developed using the bit map format. Further, the format of the font data need not be limited to this. For example, it is possible to have font data in the vector format, etc.

Figure 7:
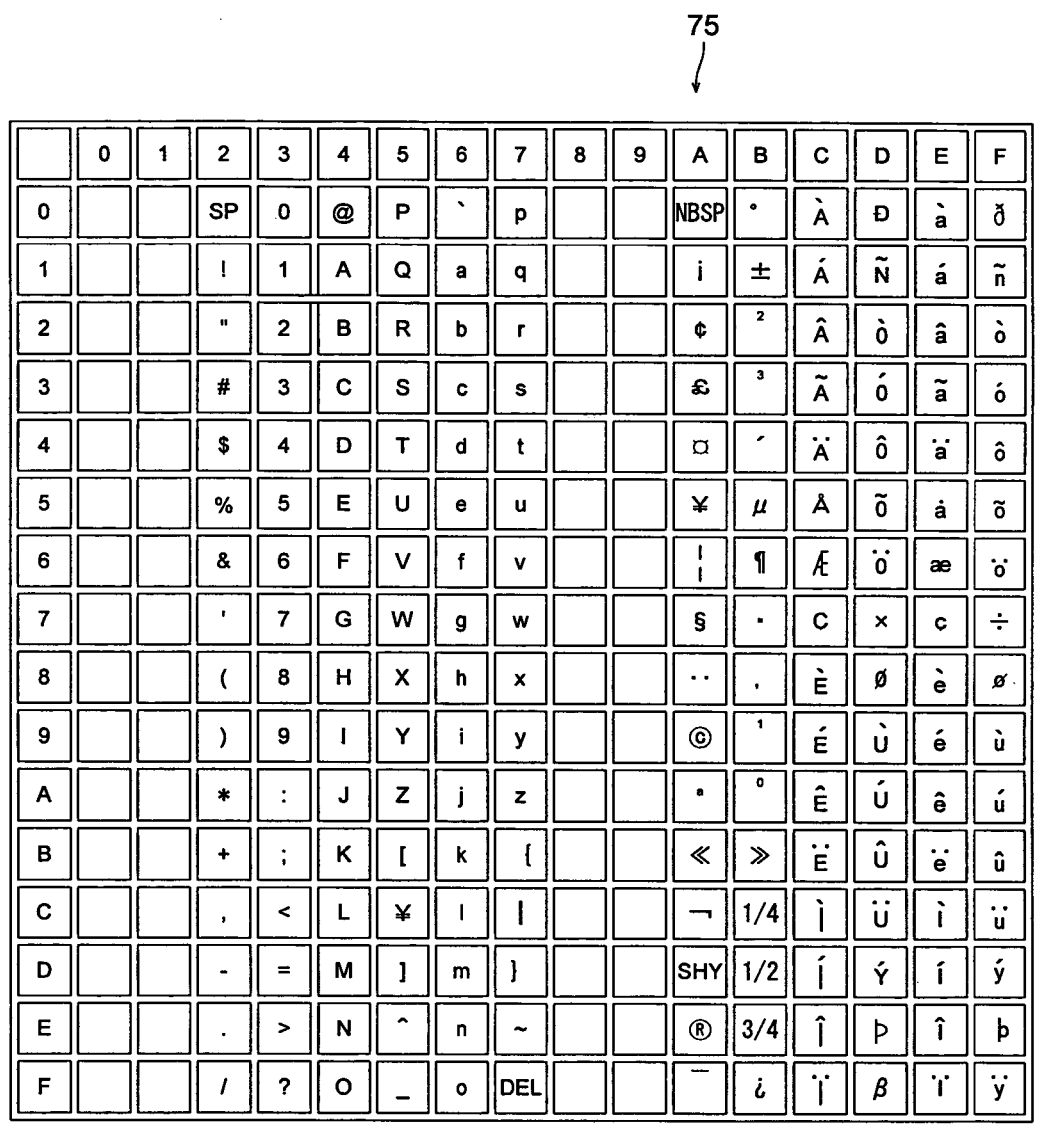
FIG. 7 is an explanatory diagram showing an example of the character code table related to character code which is used for each message data of each the vernacular message group registered in message DB of the data processing apparatus related to the embodiment of the present invention.

FIG. 7 shows an example of the character code table 75 which is a list of the character codes used in the message data. This figure shows the ISO-8859 character code table. The character code system need not be limited to this but any character code system for the specific country can be used. For example, the Shift-JIS character code system can be used for the Japanese language.

Next, the operation of the data output system 10 is explained below.

Figure 8:
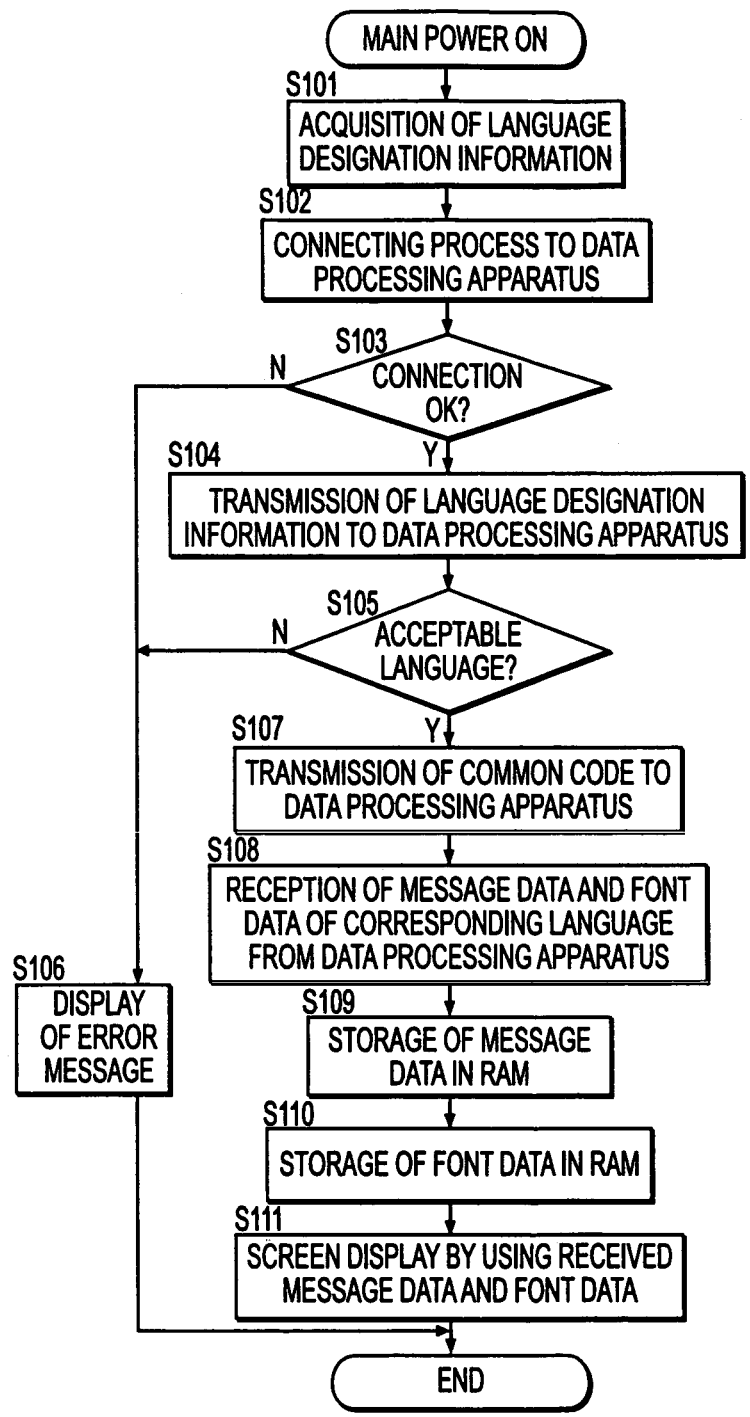
Figure 9:
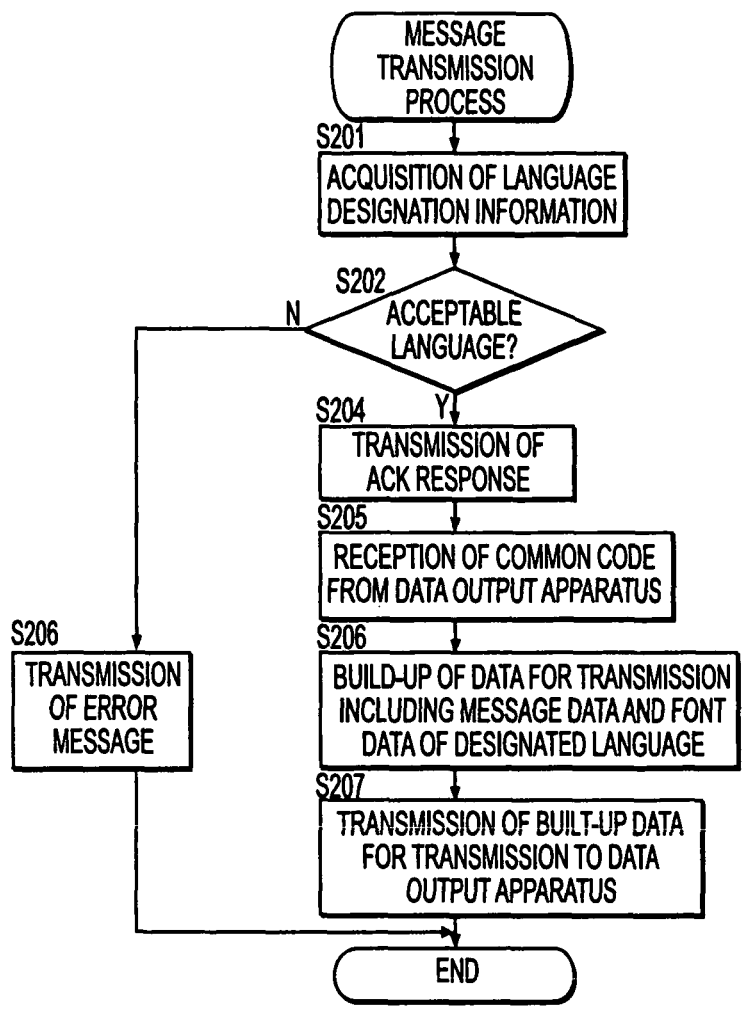
FIG. 9 is a flowchart showing the operations of the data processing apparatus related to the embodiment of the present invention.

FIG. 8 shows the flow of operations carried out by the multi function peripheral 20 which is the data output device when the power supply is switched ON, and FIG. 9 shows the operations of the data processing apparatus 60 associated with the operations of the multi function peripheral 20. The multi function peripheral 20 reads the language designation information 43 from the non-volatile RAM 24, and obtains the type of language that had been designated when the power was switched OFF last (Step S101). Further, the language designation information 43 appropriate for the destination of shipment is stored in the non-volatile RAM 24 at the time of shipment from the factory.

Next, the multi function peripheral 20 carries out the processing of establishing communication connection with the data processing apparatus 60 (Step S102), and if the connection cannot be made (Step S103: N), it makes an error display (Step S106) and terminates this processing (End). If the communication connection with the data processing apparatus 60 could be established normally (Step S103: Y), it transmits the language designation information 43 obtained earlier from the non-volatile RAM 24 to the data processing apparatus 60 (Step S104).

When the data processing apparatus 60 receives the language designation information 43 from the multi function peripheral 20 (FIG. 9, Step S201), it first checks whether that language can be supported or not (Step S202). Specifically, it checks whether the message data or font data of the language indicated by the language designation information 43 has been registered in message DB 64 or the font DB 63. Next, if the language designated by the received language designation information 43 cannot be supported (Step S202: N), the data processing apparatus 60 transmits a response indicating that the language cannot be supported, to the multi function peripheral 20 (Step S203), and if it can be supported (Step S202: Y), it transmits an ACK response to the multi function peripheral 20 (Step S204).

When the multi function peripheral 20 receives from the data processing apparatus 60 a response indicating that the language cannot be supported (FIG. 8, Step S105: N), it makes an error display (Step S106) and terminates the processing (End). On the other hand, if an ACK response is received (Step S105: Y), it reads the common code 40 stored in the flash ROM 22, first converts these common codes 40 into a data structure corresponding to the internal codes 45 as shown in FIG. 3(c), and transmits to the data processing apparatus 60 (Step S107).

When the data processing apparatus 60 receives the common code 40 from the multi function peripheral 20 (FIG. 9, Step S205), it not only extracts, from the message DB 64, the message data identified by the received common code 40 and the language designation information 43 received from the same type of multi function peripheral 20 earlier, but also reads the font data corresponding to the language designation information from the font DB 63, and forms the delivery data including this font data and the message data extracted earlier (Step S206). Next, this delivery data is transmitted to the relevant multi function peripheral 20 (Step S207).

When the multi function peripheral 20 receives the above delivery data from the data processing apparatus 60 (FIG. 8, Step S108), it stores the message data included in it at a specific location of the RAM 23 (Step S109), and also stores the font data included in it in a corresponding area of the RAM 23 (Step S110). Thereafter, the screens such as the standby screen, etc., are displayed in the operational display section 27 using the font data 41 and the message data 42 stored in the RAM 23 (Step S111). Further, the font data 41 and the message data 42 stored in the RAM 23 are used, apart from displaying the standby screen, for preparing the display data for displaying various types of screens and for preparing the print data for printing various types of reports.

Figure 10:
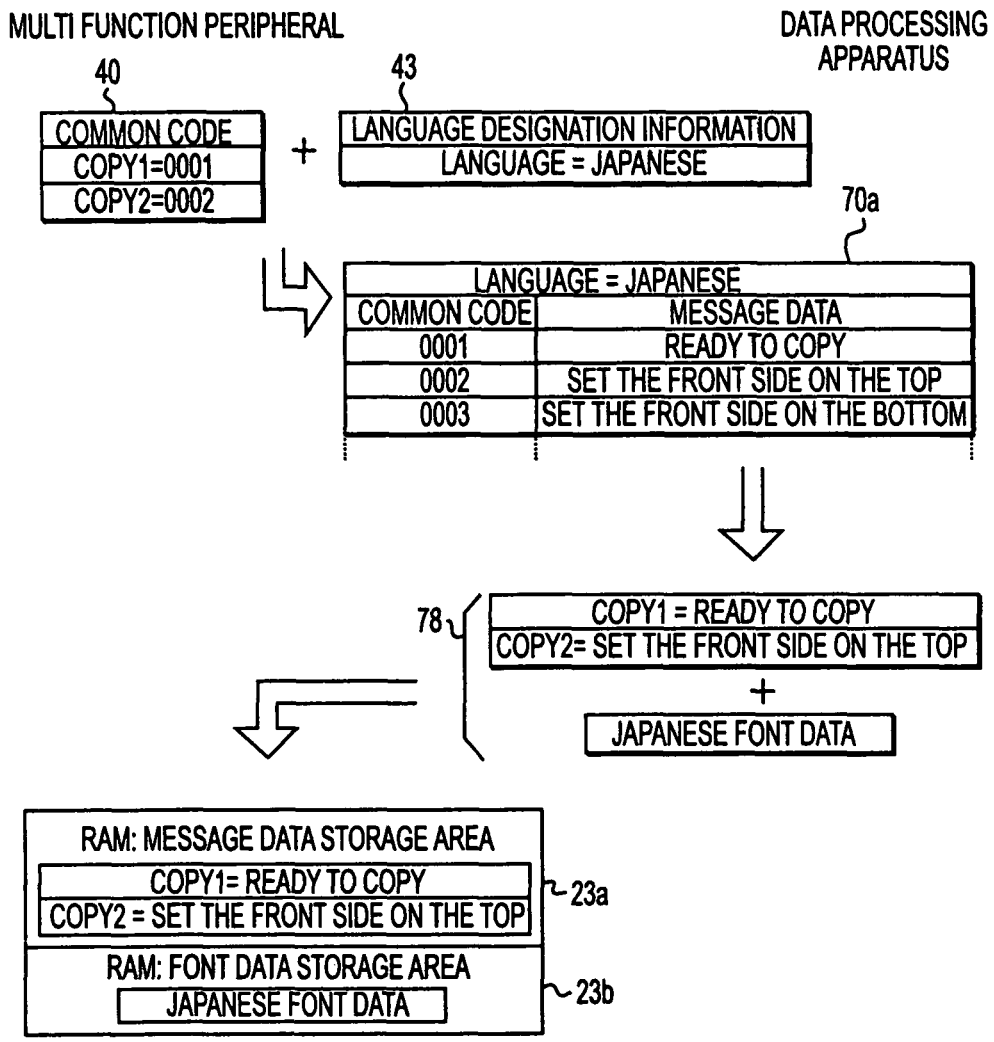
FIG. 10 is an explanatory diagram schematically showing the exchange of data during the operations shown in FIGS. 8 and 9.

FIG. 10 schematically shows the exchange of data during the above operations. For example, when the multi function peripheral 20 sends the common codes 40 "0001" and "0002" and the language designation information 43 designating Japanese to the data processing apparatus 60, the data processing apparatus 60 searches for the message data 70*a* related to Japanese from the message DB 64. The data processing apparatus 60 extracts, from that, the message "Ready to Copy (in Japanese)" corresponding to the common code "0001" and the message "Set the front side on the top (in Japanese)" corresponding to the common code "0002" and constructs the delivery data 78 including these message data and Japanese font data, and the transmits it to the multi function peripheral 20. In actuality, each message data are in the form of a string of character codes expressing each character in the message by its corresponding character code for Japanese. For example, the characters in the Japanese message "copy (in Japanese)" are data "0x8352, 0x8373, 0x815B", using the character codes in the Shift-JIS.

The multi function peripheral 20 stores the message data received from the data processing apparatus 60, that is, the string of character codes for the message "Ready to Copy (in Japanese)" and the string of character codes for the message "Set the front side on the top (in Japanese)" in the message data storage area 23*a* in the RAM 23 while establishing their correspondence with the internal codes. Further, the Japanese font data received from the data processing apparatus 60 is stored in the font data storage area 23*b* in the RAM 23.

The multi function peripheral 20, when preparing the display data to be displayed in the operational display section 27 or when preparing the print data for printing out various types of reports using the message data 42 stored in the RAM 23, carries out the processing of developing each character code constituting the message data 42 into the image data in the bit map format using the font data 41 stored in the RAM 23 corresponding to that character code. This processing is the same even if the language is different. In other words, if for example, the designated language is English, the multi function peripheral 20 receives the message data and the font data in English from the data processing apparatus 60 and stores them in the RAM 23. Therefore, if the processing of developing into image data is carried out in the same manner as for Japanese, as a result, display in English is realized.

Figure 11:
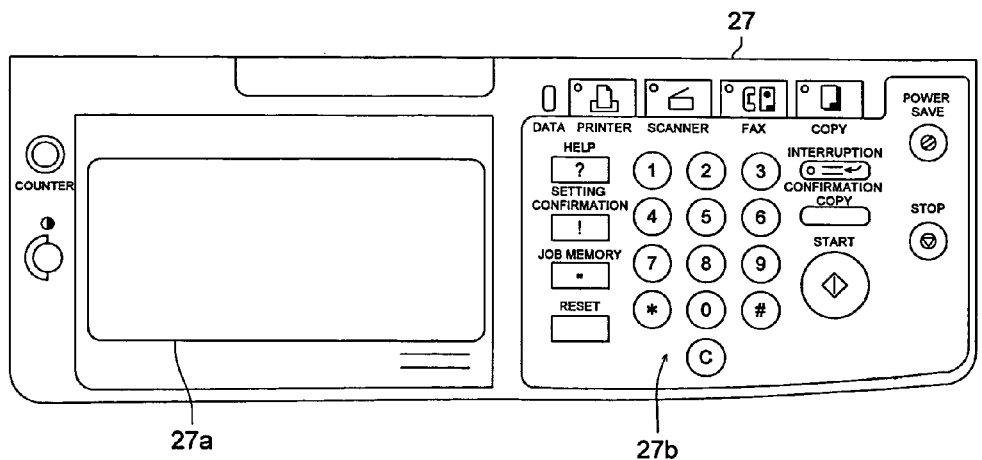
FIG. 11 is a front view showing the operational display section provided in the multiple function processing apparatus related to the embodiment of the present invention.

FIG. 11 shows the external appearance of the operational display section 27 provided in the multi function peripheral 20. The operational display section 27 is provided with a liquid crystal display 27*a* having a touch panel on its surface, and a key operation section 27*b* in which are arranged the ten keys and the start key, etc.

Figure 12:
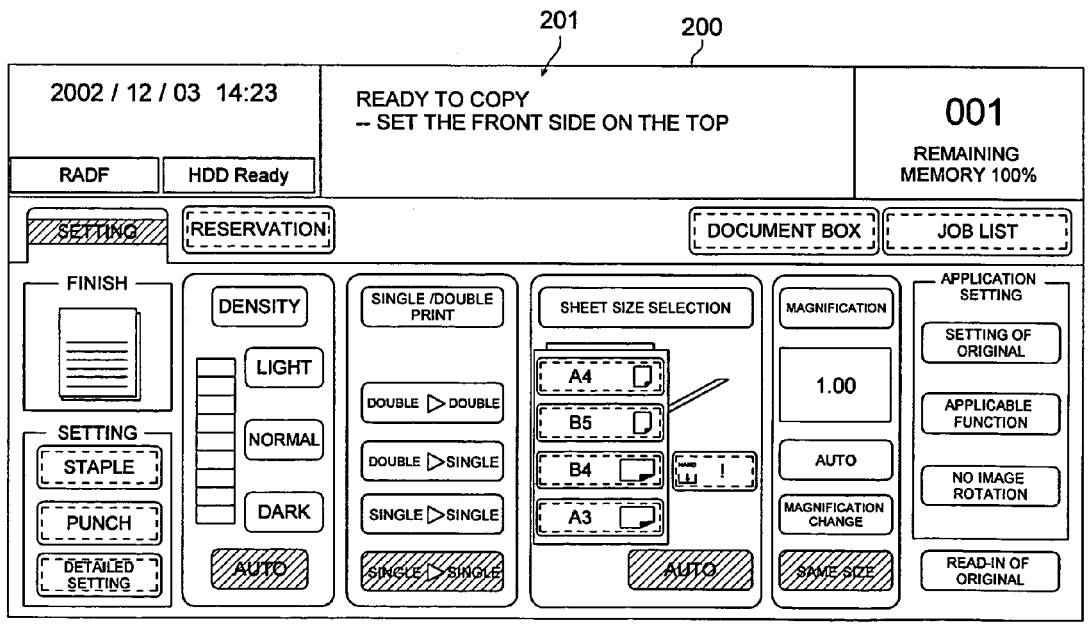
FIG. 12 is an explanatory diagram showing an example of the basic screen for copying which the multiple function processing apparatus related to the embodiment of the present invention displays.

FIG. 12 shows an example of the basic screen for copying 200 displayed on the liquid crystal display 27*a* of the operational display section 27. Each of the messages displayed in the basic screen for copying 200 is prepared based on the message data 42 and the font data 41 acquired from the data processing apparatus 60 and stored in the RAM 23. For example, the text display 201 of "Ready to Copy" is prepared by developing the bitmap image using the string of character codes corresponding to the internal code "Copy1" which is stored in the RAM 23 and using the Japanese font data also stored in the RAM 23.

FIG. 13 shows a part of a communication control report 210 which is an example of the report printed out using the message data 42 and the font data 41 obtained from the data processing apparatus 60 and stored in the RAM 23.

Next, the processing of switching the language is explained below.

Figure 16:
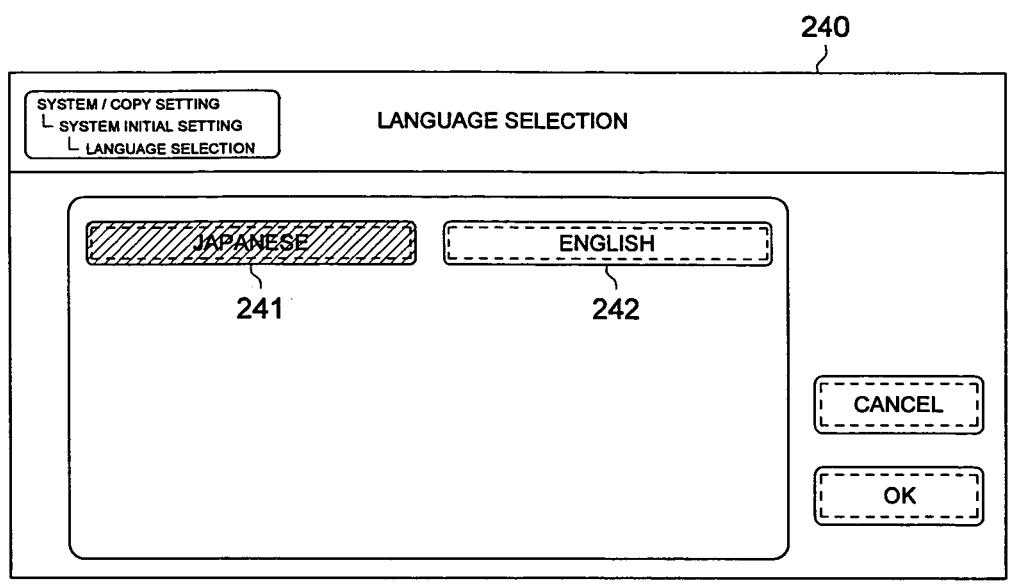
FIG. 16 is an explanatory diagram showing an example of the language selection screen which the multiple function processing apparatus related to the embodiment of the present invention displays.

When some specific operations including manager verification, etc., are made from the standby screen not shown in the figure, the system/copy settings menu screen 220 shown in FIG. 14 is displayed in the liquid crystal display 27*a* of the operational display section 27. Here, if the "1: System initial settings" button 221 is operated, the display changes to the system initial settings screen 230 shown in FIG. 15. In addition, if the "2: Language selection" button 231 is operated on this system initial setting screen 230, the display changes to the language selection screen 240 shown in FIG. 16. The "Japanese" button 241 and the "English" button 242 are provided on the language screen 240, and by operating the language selection button 241 or 242 corresponding to the desired language, it is possible to change the display language and the printing language in that multi function peripheral 20 to the selected language.

Figure 17:
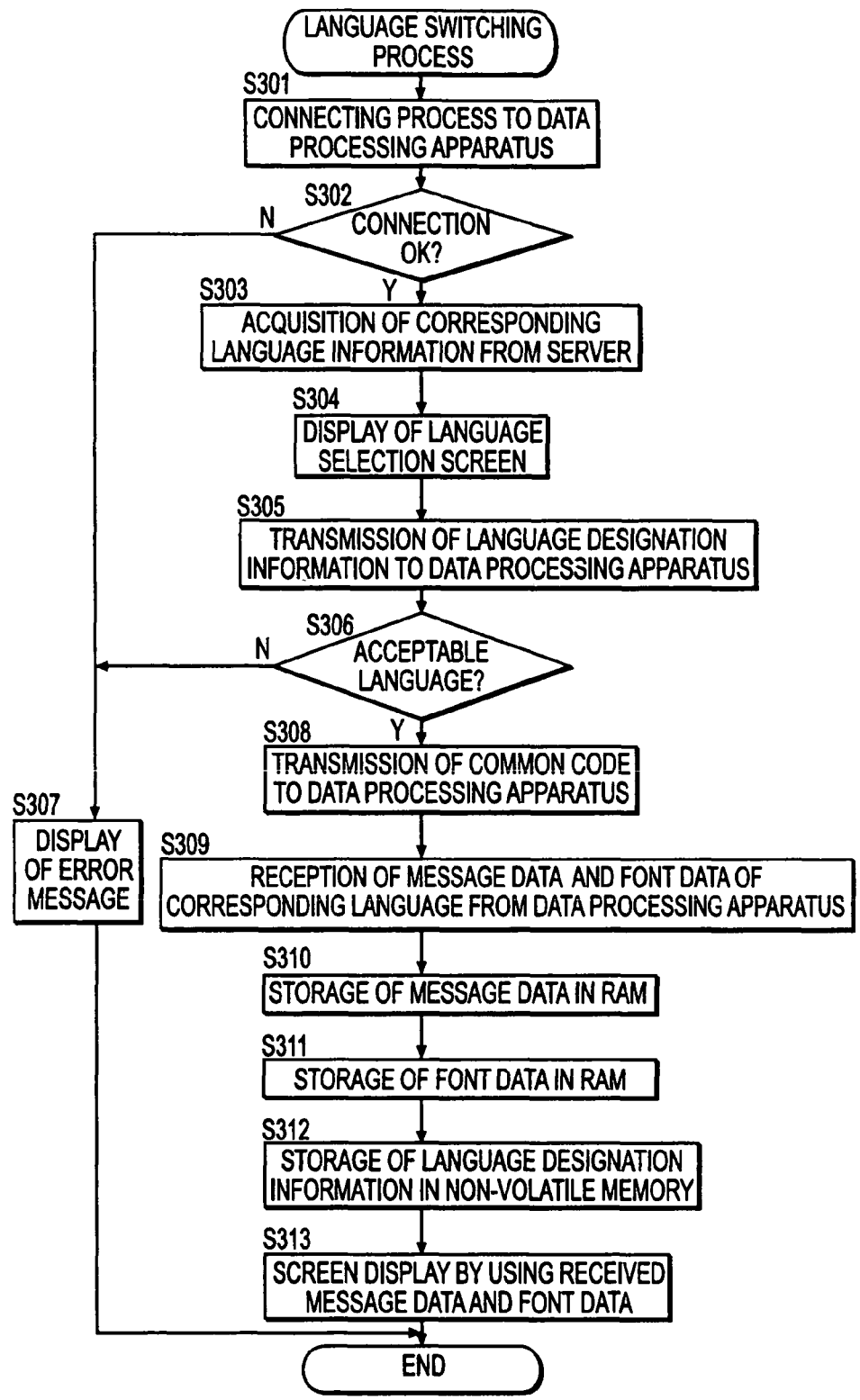
FIG. 17 is a flowchart of language switching process which the multiple function processing apparatus related to the embodiment of the present invention executes.

FIG. 17 shows the flow of language switching process of changing a language based on the operation by the user. When the "2: Language selection" button 231 is operated in the system initial setting screen 230 shown in the FIG. 15, the operation of establishing communication connection with the data processing apparatus 60 is carried out by the multi function peripheral 20 (Step S301), and if the connection can not be made (Step S302: N), an error display is made (Step S307) and this processing is terminated (End). If the connection with the data processing apparatus 60 is made normally (Step S302: Y), the supported language information indicating the languages supported by the data processing apparatus 60 is received from the data processing apparatus 60 (Step S303). A language selection screen 240 is prepared having language buttons corresponding to each language indicated in this supported language information is displayed on the operational display section 27 (Step S304).

When the user selects any language on this language selection screen 240, the multi function peripheral 20 transmits the language designation information indicating that selected language to the data processing apparatus 60 (Step S305). If a response indicating that the language designated in this language designation information cannot be supported is received from the data processing apparatus 60 (Step S306: N), an error message is displayed (Step S307) and the processing is terminated (End).

On the other hand, if the ACK response indicating that the language designated in this language designation information can be supported is received from the data processing apparatus 60 (Step S306: Y), the common codes 40 stored in the flash ROM 22 are read out, these common codes 40 are converted into a data structure with correspondence established between these common codes and the internal code 45 shown in FIG. 3(*c*) and is transmitted to the data processing apparatus 60 (Step S308).

When the multi function peripheral 20 receives the delivery data 78 including the message data identified by this transmitted common code 40 and the language designation information, and the font data of the language indicated by the language designation information from the data processing apparatus 60 (Step S309), it stores the message data included in this delivery data 78 in a specific area of the RAM 23 (Step S310), and also stores the font data included in this delivery data 78 in a corresponding area of the RAM 23 (Step S311).

In addition, the language designation information indicating the language selected this time is stored in the non-volatile RAM 24 (Step S312). Thereafter, by using the font data 41 and the message data 42 stored in the RAM 23, the display language of the different screens and the language of printed out reports is changed to the language selected this time (Step S313).

Further, since when the power supply is switched ON next time, the message data, etc., is received from the data processing apparatus 60 using the language designation information 43 after the language has been updated and stored in the non-volatile RAM 24, the language selected by the selection operations made this time is valid even after the power supply is switched OFF and ON thereafter.

In this manner, because the multi function peripheral 20 stores the common codes necessary within itself, by merely changing the language designation information that is used in combination with these common codes 40, it is possible to support the languages of different countries by obtaining the message data in various languages from the data processing apparatus 60. As a result, there is no longer any need to store the message data of all the required languages in the multi function peripheral 20, and hence it is possible to reduce the ROM capacity required in the multi function peripheral 20.

Further, since the multi function peripheral 20 is managing within itself all the necessary common codes 40, it is not necessary to manage, in the data processing apparatus 60, the message data related to the which functions are needed by each individual multi function peripheral 20. In addition, since there is also no one-sided transmission of message data related to a function that the multi function peripheral 20 does not require, from the data processing apparatus 60, not only the volume of communication decreases but also there is no wasteful consumption of storage area in the multi function peripheral 20 due to any unnecessary messages received from the data processing apparatus 60.

Next, the operations related to the character conversion processing are described below.

The data output system 10 is provided with the function of transmitting, to the data processing apparatus 60, the character information inputted from the operational display section 27 of the multi function peripheral 20, and obtaining the conversion alternatives corresponding to this character information from the data processing apparatus 60, and then allowing the user to select the desired one from these conversion alternatives. This function, for example, corresponds to the kana-kanji conversion function in Japanese.

Figure 18:
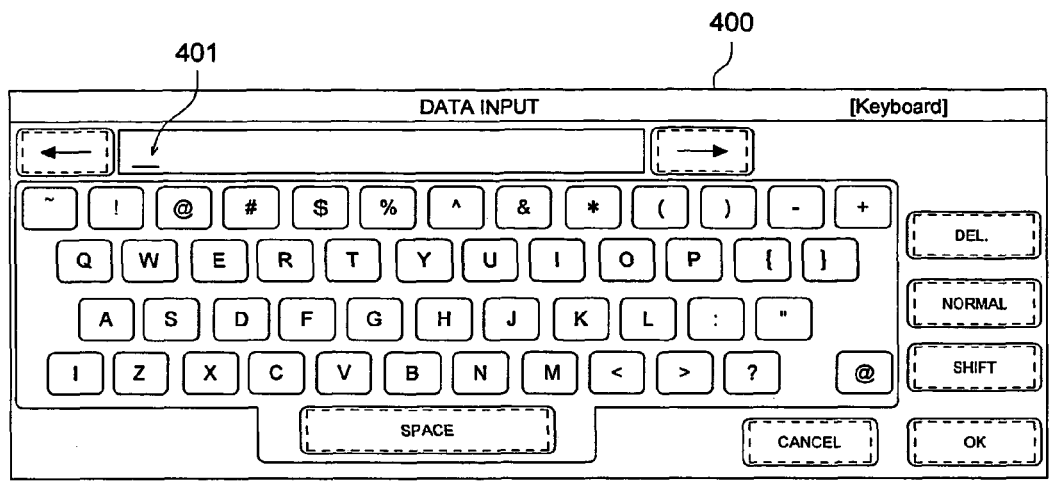
FIG. 18 is an explanatory diagram showing an example of the alphabetic character input screen which the multiple function processing apparatus related to the embodiment of the present invention displays.
Figure 19:
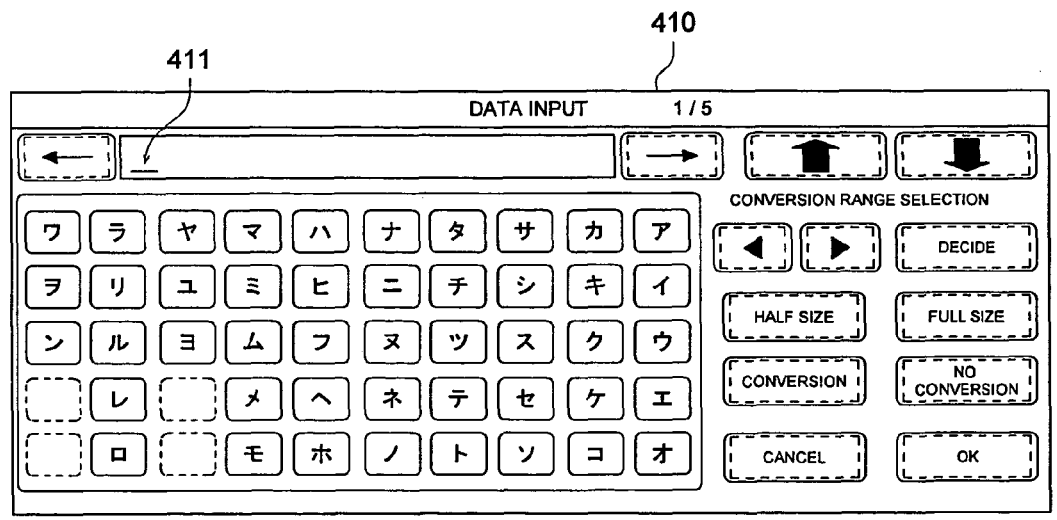
FIG. 19 is an explanatory diagram showing an example of the kana character input screen which the multiple function processing apparatus related to the embodiment of the present invention displays.

FIG. 18 is an example of the alphabetic character input screen 400 for inputting any character information by the user. Also, FIG. 19 shows an example of the kana character input screen 410 for inputting character information in Japanese kana characters. The alphabetic character input screen 400 and the kana character input screen 410 are displayed in the liquid crystal display 27*a* of the operational display section 27. The user can input any character string in the data input areas 401 and 411 by operating the character keys and the arrow keys displayed on these screens.

Figure 20:
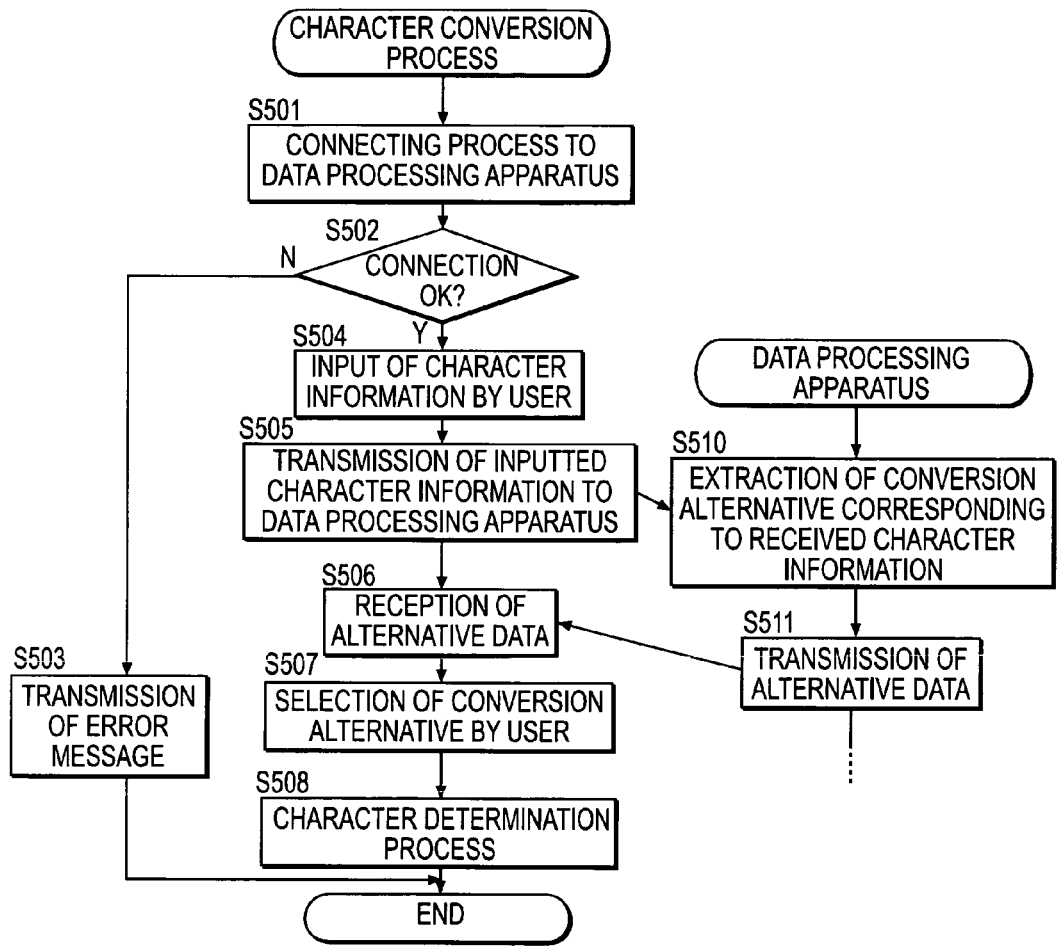
FIG. 20 is a flowchart of the character conversion processing which the data output system related to the embodiment of the present invention executes.

FIG. 20 shows the flow of the character conversion processing. The character conversion processing is initiated, for example, when the alphabetic character input screen 400 or the kana character input screen 410 is displayed. Firstly, the communication connection processing for establishing connection with the data processing apparatus 60 is carried out (Step S501), and if the connection cannot be established (Step S502: N), an error message is displayed (Step S503) and this processing is terminated (End).

When the connection with the data processing apparatus 60 is established normally (Step S502: Y), the character information inputted by the user via the kana character input screen 410, etc., is received (Step S504). Next, the character information that has been inputted is transmitted to the data processing apparatus 60 (Step S505).

The extraction section 62 of the data processing apparatus 60 that has received the character information, first searches the dictionary DB 65 using the received character information, and extracts the conversion alternatives corresponding to that character information (Step S510), and then transmits the conversion alternative information expressing these extracted conversion alternatives to the multi function peripheral 20 (Step S511).

Figure 21:
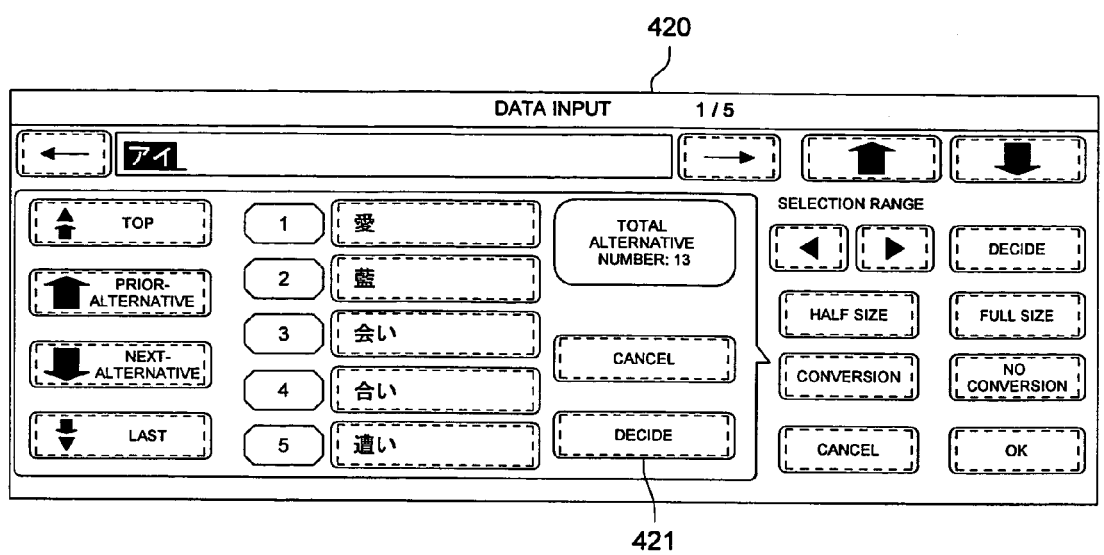
FIG. 21 is an explanatory diagram showing an example of the conversion alternative display screen which the multiple function processing apparatus related to the embodiment of the present invention displays.

The multi function peripheral 20 receives and acquires the conversion alternative data from the data processing apparatus 60 (Step S506), and displays the conversion alternatives expressed by this conversion alternative data on the conversion alternative display screen 420 as is shown in FIG. 21. Next, when it receives, from the user, the operation of selecting the desired one from among the displayed conversion alternatives (Step S507), it determines the characters corresponding to that character information (Step S508) and terminates the processing (End).

For example, on the conversion alternative display screen 420 shown in FIG. 21, as a result of transmitting the character information "ai" (in Japanese kana) to the data processing apparatus 60, thirteen conversion alternatives including a number of different kanji characters are obtained and are displayed in a single column. When the user selects any one of the conversion alternatives and operates the "Decide" button 421, the corresponding conversion alternatives is determined for this character information "ai" (in Japanese kana).

Further, when transmitting character information to the data processing apparatus 60, it is also possible to use a common code. For example, common codes are assigned beforehand to each of the keys on the alphabetic character input screen 400 or the kana character input screen 410. The character information that has been inputted is expressed by a string of common codes in which the common codes are arranged in the order in which the characters have been inputted. Next, the language designation information indicating the type of language that has currently been selected in this multi function peripheral 20 and the above string of common codes are transmitted to the data processing apparatus 60. The data processing apparatus 60 selects the dictionary to be searched based on the received language designation information, and searches this dictionary, and then extracts the conversion alternatives corresponding to the character string expressed by the above string of common codes. The processing after extracting the conversion alternatives is the same as that explained for FIG. 20.

In addition, the conversion processing need not be limited to kana-kanji conversion of the Japanese language. For example, it is possible that the function is a translation function of converting English into Japanese or into French, etc.

In this manner, by making the data processing apparatus 60 possess a dictionary for conversion and the function of conversion processing, it is possible to reduce the storage capacity or the processing work load of the multi function peripheral 20. In addition, by placing the dictionary and the function of conversion processing on the side of the data processing apparatus 60, it is possible to meet the needs for making modifications or additions to the dictionary or to change the conversion process in a flexible manner.

Further, regarding the function related to the conversion processing, the communication section 61 of the data processing apparatus 60 functions as the first reception section that receives the character information transmitted from the multi function peripheral 20, and also functions as the extraction result transmission section that transmits the conversion alternatives extracted by the extraction section 21 to the multi function peripheral 20. In addition, the network control section 29 of the multi function peripheral 20 functions as the transmission section that transmits character information to the data processing apparatus 60, and as the second reception section that receives the conversion alternatives from the data processing apparatus 60. Further, the operational display section 27 also functions as an input section for character information, and as a selection section for selecting the desired one from among several conversion alternatives.

Though preferred embodiments of the present invention have been explained referring to the drawings, specific structures are not limited to the above embodiments, and modifications and additions within this scope, without deviation from the spirit of the present invention, are included in the invention.

For example, though examples to correlate to a specific language of a country by using common codes were explained, the type of representation is designated by designation information, instead of types of language (country information) such as font size, representation for adults and children with syllabic writing, and for people with weak eye sight as well as for ordinary people. With a change of designation, it can be structured that message data related to each type of representation are acquired from data processing apparatus 60 by using the common code.

As preferred embodiments, communication management report 210 was exemplified as an example of printing based on data acquired by common code 40. It may also be a transmission reservation report, a transmission error report, a machine management report showing various sorts of setting information and a user's setting list in the facsimile communication.

In the preferred embodiments, message data and font data are acquired from data processing apparatus 60, however it can also be structured that font data and message data which were previously obtained from data processing apparatus 60 are stored in a hard disc device or the like, and requirement for data transmission is sent to data processing apparatus 60 only when the language is changed or the common codes are revised.

In the preferred embodiments, message data acquired by the common code are stored correlating to an internal code, however the common code can be directly used as the internal code for the internal control.

The data structure is not limited to the above embodiments when the common code or language designation information are sent to data processing apparatus 60 from multi function peripheral 20. It may be sent as header information of electronic mail or as main text or other methods.

Further, in these embodiments, common codes related to functions which multi function peripheral 20 does not have, are not registered in a flash ROM, however common codes of functions which can be necessary for the type of apparatus, including an optional addition may be previously stored. In such cases, information showing "effective"/"ineffective" for each function is installed and only the common codes related to the effective functions may be sent to data processing apparatus 60. By this means, when an optional apparatus is added, display and printing can be corresponded to the added function, only if information indicating functions related to the optional apparatus is changed from "ineffective" to "effective". Further, for example, the common codes may be structured to be additionally registered from recording media or servers.

The languages to be designated at one time by language designation information may be two or more types. After confirmation of the type of language which can be corresponded to the data processing apparatus and buttons of languages which the data processing apparatus can cope with are displayed on language selection screen 240, however according to the destination of shipment of the apparatus, the types of languages which can be selected on the multi function peripheral 20 are previously restricted to be selectable within a limited scope.

Further, though in these embodiments, an example where data correlated to the common codes are letter codes was explained, they need not be necessarily letter codes and may be data of an image. For example, in the case that different symbols having the same meaning are used in various countries, it can be structured that a common code is assigned to the symbol for each country, and the symbol is identified by the common code and the designation information designating a country to obtain the image data of the symbol.

According to the data output apparatus, in the data processing apparatus and the data output system which are related to the embodiment of the present invention, common codes are assigned to plural data of different types such as languages and when the data output apparatus sends designation information indicating the common code and type of data (for example, type of language) to the data processing apparatus, the data specified by the common code and designation information are sent from the data processing apparatus to the data output apparatus. The data processing apparatus, therefore, can acquire desired ones from among plural data correlated to the common code by only storing the common code the apparatus needs. By this section, memory capacity needed for the data output apparatus is reduced compared to the case where data of all types are stored in the data output apparatus. That is, a changing function of output form can be realized corresponding to the language of each country or other requirements without storing a large amount of data on the data output apparatus side.

Further, since common codes to specify necessary data are stored in the data output apparatus, it is not necessary for the outer terminal side (data processing apparatus) to control which data is needed by each of the data output apparatus, whereby the load of the outer terminal is reduced. Still further, since data to be sent from the outer terminal to the data output apparatus are designated from the data output apparatus side by using the common codes and the designation information, only necessary data are sent from the outer terminal to the data output apparatus, whereby the communication load is reduced, and on the data output side, the memory area is not consumed in vain by unnecessary data received from an outer terminal.

In a system in which, when inputted character information is sent from the data output apparatus to the data processing apparatus, plural conversion alternatives corresponding to the character information is sent from the data processing apparatus to the data output apparatus, a conversion function is realized without having a function to search for conversion alternatives or a dictionary in which conversion alternatives are registered on the data output apparatus side, whereby the data output apparatus can be simplified.

What is claimed is:

1. A data output apparatus which can be connected with a data processing apparatus which stores a plurality of message groups corresponding to a plurality of languages, wherein each of the plurality of message groups includes a plurality of message data, and the plurality of message data and a plurality of common codes are stored such that a common code is associated with message data corresponding to different languages and having a same meaning, the data output apparatus comprising:
a first storage for storing in advance a first common code which is a part of the plurality of common codes stored in the data processing apparatus, the first common code corresponding to a function or a model of the data output apparatus,
a second storage for storing language designation information which designates a language;
a transmitting section for transmitting the first common code which corresponds to the function or the model of the data output apparatus, and the language designation information to the data processing apparatus;
a receiving section which receives from the data processing apparatus, only message data which is included in one of the plurality of message groups that corresponds to the language of the transmitted language designation information and which corresponds to the transmitted first common code from among the plurality of message data stored in the data processing apparatus; and
a third storage for storing the received message data,
wherein the data output apparatus conducts output processing of a message based on the message data stored in the third storage.

2. The data output apparatus of claim 1, further comprising an output processing section which conducts the output processing,
wherein the output processing section generates image data to be outputted based on the received message data.

3. The data output apparatus of claim 1, further comprising: an operational display section;
wherein the data output apparatus switches a language to be displayed in the operational display section based on the received message data.

4. The data output apparatus of claim 1, further comprising: a print section;
wherein the data output apparatus switches a language to be printed in the print section based on the received message data.

5. The data output apparatus of claim 1, further comprising: a selector section which selects the language designation information;
wherein the transmitting section transmits the language designation information selected by the selector section to the data processing apparatus.

6. The data output apparatus of claim 1,
wherein the designation information stored in the second storage is used when the data output apparatus is turned on.

7. The data output apparatus of claim 1,
wherein the receiving section further receives font data identified by the language designation information from the data processing apparatus.

8. The data output apparatus of claim 7,
wherein the function includes at least one of a scanner function, a copy function, a print function, and a facsimile function.

9. A data output system, comprising:
a data output apparatus; and
a data processing apparatus connected to the data output apparatus;
wherein the data output apparatus includes:
a first storage for storing in advance a first common code which is a part of a plurality of common codes stored in the data processing apparatus and which corresponds to a function or a model of the data output apparatus
a second storage for storing language designation information which designates a language; and
a transmitting section for transmitting the first common code which corresponds to the function or the model of the data output apparatus, and the language designation information to the data processing apparatus,
wherein the data processing apparatus includes:
a data storage which stores a plurality of message groups corresponding to a plurality of languages, wherein each of the plurality of message groups includes a plurality of message data, and the plurality of message data and the plurality of common codes are stored such that a common code is associated with message data corresponding to different languages and having a same meaning;
a request receiving section which receives the first common code and the language designation information transmitted from the transmitting section of the data output apparatus;
an extracting section which extracts only message data included in one of the plurality of message groups that corresponds to the language of the transmitted language designation information and which corresponds to the transmitted first common code from among the plurality of message data stored in the data storage; and
an extracting result transmitting section which transmits the extracted message data to the data output apparatus,
wherein the data output apparatus further includes:
a receiving section which receives the extracted message data from the data processing apparatus; and
a third storage for storing the received message data,
wherein the data output apparatus conducts output processing of a message based on the message data stored in the third storage.

10. The data output system of claim 9, further comprising:
an output processing section which conducts an output processing,
wherein the output processing section generates image data to be outputted based on the received message data.

11. The data output system of claim 9, further comprising: an operational display section;
wherein the data output apparatus switches a language to be displayed in the operational display section based on the received message data.

12. The data output system of claim 9, further comprising: a print section;
wherein the data output apparatus switches a language to be printed in the print section based on the received message data.

13. The data output system of claim 9, further comprising: a selector section which selects the language designation information;

wherein the transmitting section transmits the language designation information selected by the selector section to the data processing apparatus.

14. The data output system of claim 9,
wherein the designation information stored in the second storage is used when the data output apparatus is turned on.

15. The data output system of claim 9,
wherein the receiving section further receives font data identified by the language designation information from the data processing apparatus.

16. The data output system of claim 15,
wherein the function includes at least one of a scanner function, a copy function, a print function, and a facsimile function.

17. A data processing apparatus which can be connected to a data output apparatus, the data processing apparatus comprising:
a data storage which stores
a plurality of message groups corresponding to a plurality of languages, wherein each of the plurality of message groups includes a plurality of message data, and the plurality message data and a plurality of common codes are stored such that a common code is associated with message data corresponding to different languages and having a same meaning;
a request receiving section which receives a first common code which is a part of all of the plurality of common codes stored in the data storage and which corresponds to a function or a model of the data output apparatus and a language designation information which designates a language, the first common code and the language designation information being transmitted from a transmitting section of the data output apparatus;
an extracting section which extracts from the plurality of message data stored in from the data storage only message data which is included in one of the plurality of message groups that corresponds to the language of the transmitted language designation information and which corresponds to the transmitted first common code the data storage; and
an extracting result transmitting section which transmits the extracted message data to the data output apparatus.

18. A data output method for a data output apparatus which can be connected with a data processing apparatus which stores a plurality of message groups corresponding to a plurality of languages, wherein each of the plurality of message groups includes a plurality of message data, and the plurality message data and a plurality of common codes are stored such that a common code is associated with message data corresponding to different languages and having a same meaning, the data output method comprising steps of:
storing in a first storage a first common
which is a part of the plurality of common codes stored in the data processing apparatus and which corresponds to a function or a model of the data output apparatus;
storing language designation information which designates a language in a second storage;
transmitting the first common code which corresponds to the function or the model of the data output apparatus, and the language designation information to the data processing apparatus;
extracting only message data which is included in one of the plurality of message groups that corresponds to the language of the transmitted language designation information and which corresponds to the transmitted first common code from among all of the plurality of message data stored in the data processing apparatus;
receiving the extracted message data from the data processing apparatus;
storing the received message data in a third storage; and
conducting an output processing of a message based on the message data stored in the third storage.

19. The data output method of claim 18,
wherein image data to be outputted are generated based on the received message data in the operating step.

20. The data output method of claim 18, further comprising a step of:
switching a language to be displayed in an operational display section based on the received message data.

21. The data output method of claim 18, further comprising a step of:
switching a language to be printed in a print section based on the received message data.

22. The data output method of claim 18, further comprising a step of:
selecting the language designation information;
wherein the language designation information selected in the selecting step is transmitted to the data processing apparatus.

23. The data output method of claim 18,
wherein the designation information stored in the second storage is used when the data output apparatus is turned on.

24. The data output method of claim 18,
wherein font data identified by the language designation information from the data processing apparatus is received in the receiving step.

25. The data output method of claim 24,
wherein the function includes at least one of a scanner function, a copy function, a print function, and a facsimile function.

26. The data output apparatus of claim 1,
wherein the first storage and the second storage are non-volatile memories, and the third storage is a volatile memory and does not store message data to be used for the data output apparatus when power of the data output apparatus is de-activated, and
wherein when the power is activated, by transmitting the first common code stored in the first storage and the language designation information stored in the second storage to the data processing apparatus, the data output apparatus receives the message data corresponding to the first common code and the language designation information and allows the third memory to store the received message.

27. The data output system of claim 9,
wherein the first storage and the second storage are non-volatile memories, and the third storage is a volatile memory and does not store message data to be used for the data output apparatus when power of the data output apparatus is de-activated, and
wherein when the power is activated, by transmitting the first common code stored in the first storage and the language designation information stored in the second storage to the data processing apparatus, the data output apparatus receives the message data corresponding to the first common code and the language designation information and allows the third memory to store the received message.

28. The data output method of claim 18,
wherein the first storage and the second storage are non-volatile memories, and the third storage is a volatile memory and does not store message data to be used for the data output apparatus when power of the data output apparatus is de-activated, and wherein when the power is activated, by transmitting the first common code stored in the first storage and the language designation information stored in the second storage to the data processing apparatus, the data output apparatus receives the message data corresponding to the first common code and the language designation information and allows the third memory to store the received message.

\* \* \* \* \*